C. S. WELLS.
Screw-Driver.
No. 221,986.  Patented Nov. 25, 1879.
Fig. 1.
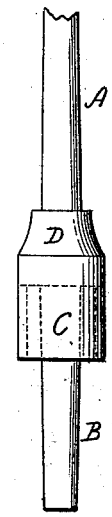
Fig. 2.
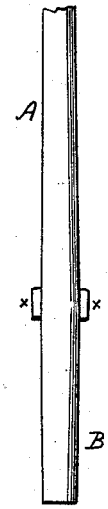
Fig. 4.
Fig. 3.
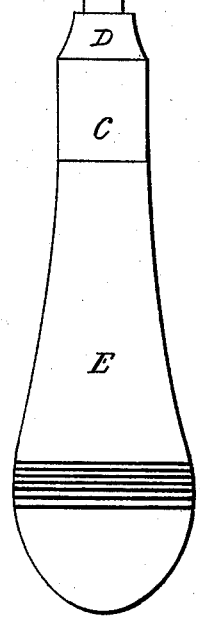
WITNESSES
William F. Hopson
Joseph Jno. Russell
INVENTOR
Charles S. Wells
by Geo. Terry
Atty

UNITED STATES PATENT OFFICE.

CHARLES S. WELLS, OF NEW HAVEN, CONNECTICUT.

IMPROVEMENT IN SCREW-DRIVERS.

Specification forming part of Letters Patent No. 221,986, dated November 25, 1879; application filed February 24, 1879.

*To all whom it may concern:*

Be it known that I, CHARLES S. WELLS, of New Haven, in the county of New Haven and State of Connecticut, have invented a new and Improved Screw-Driver, of which the following is a specification.

The object of my invention is to more securely hold the bolsters which are cast onto the round shanks of screw-drivers.

The invention consists in making the shank and tang in one piece, with enlargements, as is hereinafter more fully set forth and claimed.

In the drawings, which I make a part of my specification, Figure 1 is a view of the screw-driver. Fig. 2 is a view of a portion of the shank, of the tang, bolster, and ferrule. Fig. 3 is a cross-section of the ferrule, and shows the feathers on the inside of the same. Fig. 4 is a view of the shank and the enlargements on the same to hold the bolster.

To enable others skilled in the art to which my invention belongs to make and use it, I will describe it in detail.

A, Fig. 1, is the tapering round shank, having its end flattened in the usual form; and B, Fig. 2, is the round tang, slightly tapering in the opposite direction, the shank and tang being made in one piece with the enlargements or projections $x$. These enlargements are made by dies or wedges, and serve to more securely hold the bolster onto and over which it is cast.

The bolster D and ferrule C, Figs. 1, 2, and 4, are cast in one piece, the ferrule having the inside feathers or flanges, $a$, extending the length of the ferrule, and onto the shank, over the enlargements $x$, as before mentioned.

The handle E has one of its ends perforated, the perforation equaling in depth the length of the tang, and is turned of such size as to drive tightly into the ferrule, the upper inside edge of which is slightly rounded to receive the same.

Constructed in the above-described manner, the handle can be driven into the ferrule and against the bolster, making a screw-driver that will admit of blows on the handle, the feathers on the inside of the ferrule preventing the turning of the handle on the tang and in the ferrule.

Having described my invention, what I claim as new, and desire to secure by Letters Patent, is—

In a screw-driver, the shank and tang made in one piece, provided with the enlargements $x$, as shown and set forth.

CHARLES S. WELLS.

Witnesses:
RICHARD F. LYON,
GEORGE TERRY.